United States Patent
Tomine et al.

(10) Patent No.: US 9,509,075 B2
(45) Date of Patent: Nov. 29, 2016

(54) CONNECTOR CONNECTION STRUCTURE

(71) Applicant: Yazaki Corporation, Tokyo (JP)

(72) Inventors: Kazuhiro Tomine, Shizuoka (JP); Yasuhiro Otsuta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/980,299

(22) Filed: Dec. 28, 2015

(65) Prior Publication Data

US 2016/0118739 A1   Apr. 28, 2016

Related U.S. Application Data

(63) Continuation of application No. PCT/JP2014/067710, filed on Jul. 2, 2014.

(30) Foreign Application Priority Data

Jul. 3, 2013  (JP) ................................ 2013-139372

(51) Int. Cl.
*H01R 13/40* (2006.01)
*H01R 31/08* (2006.01)
(Continued)

(52) U.S. Cl.
CPC .......... *H01R 13/40* (2013.01); *B60R 16/0215* (2013.01); *H01R 31/08* (2013.01); *H01R 13/112* (2013.01); *H01R 13/748* (2013.01); *H01R 2201/26* (2013.01)

(58) Field of Classification Search
CPC ............................ H01R 31/08; H01R 13/748
USPC ......................................... 439/507, 509, 511
See application file for complete search history.

(56) References Cited

U.S. PATENT DOCUMENTS 5,816,850 A * 10/1998 Yamada ................. H01H 9/085
                                                                439/507
6,036,534 A * 3/2000 Hoyt ....................... H01R 31/08
                                                                439/483
(Continued)

FOREIGN PATENT DOCUMENTS

JP           9-129293 A      5/1997
JP        2002-270294 A      9/2002
(Continued)

OTHER PUBLICATIONS

International Search Report of PCT/JP2014/067710 dated Sep. 22, 2014.

*Primary Examiner* — Ross Gushi
(74) *Attorney, Agent, or Firm* — Sughrue Mion, PLLC

(57) ABSTRACT

Provided is a structure in which: after a harness-side connector including a harness-side female terminal and a unit-side connector including a unit-side female terminal are caused to face each other at a position of a through hole in a floor panel, the harness-side connector and the unit-side connector are connected by a male terminal of a male connection member. In more detail, provided is a structure in which the male terminal of the male connection member is inserted through a connection-use penetrating part of the unit-side female terminal to electrically connect two female terminals, that is, the harness-side female terminal and the unit-side female terminal, to each other. Thus, a connector connection structure that does not cause the terminals to deform can be provided, and a connector connection structure that can also enhance ease of assembly and enhance ease of maintenance as a consequence can be provided.

16 Claims, 5 Drawing Sheets

(51) Int. Cl.
   *B60R 16/02*   (2006.01)
   *H01R 13/11*   (2006.01)
   *H01R 13/74*   (2006.01)

(56) References Cited

U.S. PATENT DOCUMENTS

| | | | | |
|---|---|---|---|---|
| 6,379,179 | B2 * | 4/2002 | Shinohara | H01R 13/6315 |
| | | | | 439/252 |
| 6,905,348 | B2 * | 6/2005 | Naitou | H01R 9/2458 |
| | | | | 439/76.2 |
| 7,771,227 | B1 * | 8/2010 | Yu | H01R 13/6273 |
| | | | | 439/510 |
| 7,867,001 | B2 * | 1/2011 | Ambo | H01R 4/185 |
| | | | | 439/271 |
| 8,951,065 | B2 * | 2/2015 | Tsuge | H01R 13/631 |
| | | | | 439/559 |
| 9,318,826 | B2 * | 4/2016 | Kato | B60L 11/14 |
| 2008/0014786 | A1 * | 1/2008 | Brodsky | H01R 13/631 |
| | | | | 439/501 |
| 2009/0318002 | A1 * | 12/2009 | Murano | H01R 11/12 |
| | | | | 439/278 |
| 2016/0118739 | A1 * | 4/2016 | Tomine | H01R 13/40 |
| | | | | 439/660 |

FOREIGN PATENT DOCUMENTS

| | | |
|---|---|---|
| JP | 2003-209919 A | 7/2003 |
| JP | 2005-190720 A | 7/2005 |
| JP | 2012-79413 A | 4/2012 |

* cited by examiner

CONNECTOR CONNECTION STRUCTURE

CROSS-REFERENCE TO RELATED APPLICATION

This application is a continuation application of International Application PCT/JP2014/067710, filed on Jul. 2, 2014, and designating the U.S., the entire contents of which are incorporated herein by reference.

BACKGROUND OF THE INVENTION

1. Field of the Invention

The present invention relates to a connector connection structure.

2. Description of the Related Art

An inverter unit and a battery that are installed in, for example, a hybrid vehicle or an electrical vehicle are electrically connected to each other via a high-voltage wire harness. For running a wire harness, an end part of the harness is inserted into a through hole in a floor panel. The wire harness is then pulled into the interior of the vehicle, and electrical connection work is carried out.

Japanese Patent Application Laid-open No. 2012-79413 discloses a technique for resolving the problem, in electrical connection of a wire harness, that a work procedure and work management are inevitably complicated. Specifically, a connector connection structure is disclosed that enables elimination of connection work that involves the pulling-in thereof, thereby enabling both simplification of a work procedure and simplification of work management.

As to characteristics of the above connector connection structure, one mentionable characteristic thereof is that, when electrical connection is made between a first connection part of a first electrically-conducting path run on the outer-surface side of a panel member (underneath a floor of a vehicle) and a second connection part of a second electrically-conducting path arranged run on the inner-surface side (the junction box (J/B) or battery side) of the panel member, the connection is made in the vicinity of a through hole in the panel member. Another mentionable characteristic is that, when a connection front-end part in the first connection part of the first electrically-conducting path is inserted through the through hole, this insertion results in the connection between the connection front-end part and the second connection part of the second electrically-conducting path. While there is a first terminal accommodated in the first connection part, there is a second terminal accommodated in the second connection part. Thus, when the first connection part and the second connection part are connected to each other, the first terminal and the second terminal accommodated in the respective parts are connected to each other, and the first electrically-conducting path and the second electrically-conducting path are electrically connected as a result.

The above conventional connector connection structure is a structure requiring the connection front-end part in the first connection part to be inserted through the through hole, so that the connection front-end part and the first terminal accommodated in the connection front-end part are brought into a state projecting into the J/B or battery side. Therefore, the conventional connector connection structure involves the following problem: in a case where the first connection part and the second connection part do not face each other in appropriate connection directions, when a load at the time of replacement of a J/B or battery (the weight of the J/B or battery) is received thereby from above, the first terminal in the first connection part and the second terminal in the second connection part possibly collide with each other in states displaced from the appropriate connection directions, and such collision possibly results in deformation of the terminals.

SUMMARY OF THE INVENTION

The present invention has been made in view of the above-described situation. An object of the present invention is to provide a connector connection structure that prevents deformation of the terminals. Another object of the present invention is to provide a connector connection structure that can bring enhanced ease of assembly and enhanced ease of maintenance as a consequence.

In order to solve the above mentioned problem and achieve the object, a connector connection structure according to one aspect of the present invention includes a partitioning member configured to have a through hole; a first connector disposed on a side of one surface of the partitioning member, and configured to include a first female terminal having electrical conductivity; a second connector disposed on a side of a surface of the partitioning member that is opposite to the one surface, and configured to include a second female terminal having electrical conductivity; and a male connection member configured to include a male terminal having electrical conductivity, wherein after the first connector and the second connector are caused to face each other at a position of the through hole, the male terminal of the male connection member is caused to pass through the through hole while being connected to any one terminal of the first female terminal and the second female terminal, and then is connected to the other one of the first female terminal and the second female terminal.

With the configuration of the connector connection structure described above, a structure is provided in which, after the first connector and the second connector having the female terminals are caused to face each other at the position of the through hole in the partitioning member while the first female terminal and the second female terminal provided to the respective connectors are kept from being inserted into the through hole, the first connector and the second connector are connected by the male terminal of the male connection member. Both of the first female terminal and the second female terminal are thus kept from projecting into the respective opposite sides of the partitioning member when the first connector and the second connector are assembled with each other via the through hole. With this structure, the first female terminal and the second female terminal make no contact with each other unless the male terminal is connected thereto and brings about electrical connection. Even when the first connector or the second connector has received a load while the first connector and the second connector are not facing each other in appropriate connection directions, the first female terminal and the second female terminal do not collide with each other. Therefore, there is no risk of causing the terminals to deform. In the present invention, a panel member in a vehicle corresponds to the partitioning member, for example.

Further, in the connector connection structure according to another aspect of the present invention, it is preferable that the one terminal of the first female terminal and the second female terminal is configured to have a connection-use penetrating part therein as a penetrating part for connection, and the male terminal is configured to have a shape that allows free insertion and removal thereof into and from the first female terminal, the second female terminal, and the connection-use penetrating part.

With the configuration of the connector connection structure described above, the male terminal of the male connection member is firstly connected to any one of the first female terminal and the second female terminal via the connection-use penetrating part, and the electrical connection between the first connector and the second connector is completed by connecting the male terminal to the other of the first female terminal and the second female terminal through the through hole. With the configuration of the connector connection structure described above, a structure is provided in which the male terminal is inserted through the connection-use penetrating part to connect the two female terminals to each other. Electrical disconnection therebetween is made simply by pulling the male terminal out of the connection-use penetrating part.

Further, in the connector connection structure according to still another aspect of the present invention, it is preferable that the first connector and the second connector are configured to include a first housing and a second housing that are insulating, and the first housing and the second housing are configured to include a first engaging part and a second engaging part, respectively, that engage with each other at the position of the through hole or at a position near the through hole.

With the configuration of the connector connection structure described above, when the first connector and the second connector are caused to face each other, the first engaging part of the first connector and the second engaging part of the second connector engages with each other, so that the two connectors are aligned with each other. Therefore, the electrical connection using the male connection member is made under the condition that the positions of the connectors are fixed.

Further, in the connector connection structure according to still another aspect of the present invention, it is preferable that the male connection member is configured to include a connector engaging part that engages with one of the first connector and the second connector, the one corresponding to the one terminal of the first female terminal and the second female terminal.

With the configuration of the connector connection structure described above, having the male connection member in engagement with the first connector or the second connector via the connector engaging part results in continuation and stabilization of the electrical connection using the male connection member. Additionally, the connector engaging part is useful as a handle to be used by a worker when the worker works on the electrical connection.

Further, in the connector connection structure according to still another aspect of the present invention, it is preferable that the male connection member is a service plug for electrical disconnection.

With the configuration of the connector connection structure described above, the male connection member is provided with a function of being a service plug. In this case, the need to additionally provide a service plug to another device side (for example, on the J/B or battery side) is eliminated.

The present invention is briefly explained as described above. Further, a detail of the present invention will be more clarified by reading through a mode for carrying out the invention described below (hereinafter referred to as "embodiment") by referring to the accompanying drawings.

DETAILED DESCRIPTION OF THE PREFERRED EMBODIMENTS

When being applied to a vehicle, a connector connection structure serves as a structure where, after a first connector (a harness-side connector) and a second connector (a unit-side connector) including respective female terminals are caused to face each other at the position of a through hole in a partitioning member (a floor panel), these first and second connectors are electrically connected to each other by use of a male connection member.

Figure 1:
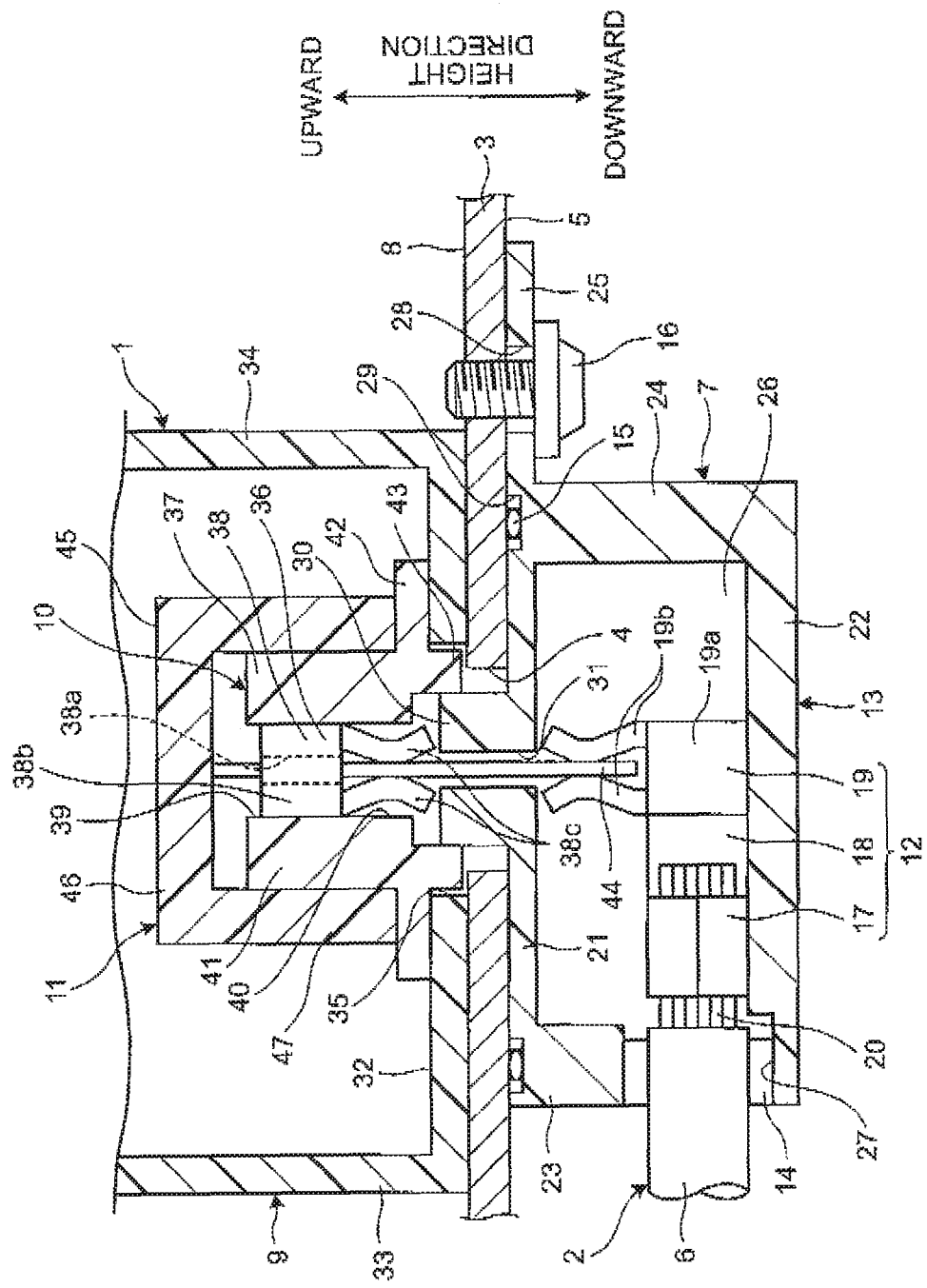
FIG. 1 is a cross-sectional view illustrating a state of electrical connection using a connector connection structure in the present invention.

One embodiment of the present invention is described with reference to the drawings. The following description exemplifies a case in which the present invention is applied to a hybrid vehicle (which may be an electrical vehicle). FIG. 1 is a cross-sectional view illustrating a state of electrical connection using a connector connection structure in the present invention.

In FIG. 1, the hybrid vehicle is a vehicle that is driven by two types of power from an engine and a motor unit in combination, where electricity is supplied from an on-vehicle battery unit 1 to the motor unit via an inverter unit. In the present embodiment, the engine, the motor unit, and the inverter unit are installed in an engine compartment corresponding to a position where the front wheels or other parts are located. The on-vehicle battery unit 1 is installed in the vehicle interior, which is located in the rear of the engine compartment, or in a rear portion of the vehicle in which the rear wheels or other parts are located. The on-vehicle battery unit 1 includes a high-voltage battery. It is assumed that the on-vehicle battery unit 1 in the present embodiment includes a publicly known junction box (J/B).

The on-vehicle battery unit 1 and the inverter unit are connected to each other via a high-voltage wire harness 2. This wire harness 2 is run underneath a floor of the vehicle. The wire harness 2 is also run substantially in parallel to the floor of the vehicle. Reference sign 3 indicates a floor panel. The floor panel 3 corresponds to a partitioning member described in the claims, and has a through hole 4 formed at a predetermined position therein.

The wire harness 2 is run on the side of the floor panel 3 corresponding to one surface 5 thereof (on the underfloor side of the vehicle). The wire harness 2 includes: one or a plurality of high-voltage electrically-conducting paths 6; an armoring member (not illustrated) that accommodates and protects the high-voltage electrically-conducting paths 6; a connector (not illustrated) provided at the front end of each of the high-voltage electrically-conducting paths 6; a harness-side connector 7 (a first connector) provided at the rear end of each of the high-voltage electrically-conducting paths 6 likewise; and a shield structure for imparting an electromagnetic shielding function.

In the present embodiment, the drawings omit illustration of the above shield structure for simplification of explanations (regarding the shield structure, a structure disclosed in Patent Literature 1 in Background serves as a useful reference).

The on-vehicle battery unit 1 is installed on the side of the floor panel 3 corresponding to an opposite surface 8 (on the interior side of the vehicle). The on-vehicle battery unit 1 includes a unit case 9, a high-voltage battery (not illustrated), a J/B (not illustrated likewise), and a unit-side connector 10 (a second connector). The high-voltage battery is a Ni-MH based or Li-ion based battery, and has a modularized structure (for example, use of a rechargeable battery device such as a capacitor is allowed). The on-vehicle battery unit 1 is not particularly limited as long as it is usable in a hybrid vehicle or an electrical vehicle. In the following description, one side of the floor panel 3 corresponding to the opposite surface 8 (the interior side of the vehicle) is referred to as the "upper side" in a height direction, and one side of the floor panel 3 corresponding to the one surface 5 (on the underfloor side of the vehicle) is referred to as the "lower side" in the height direction. This "height direction" may be a direction other than the vertical direction.

At the position of the through hole 4 in the floor panel 3, the harness-side connector 7 and the unit-side connector 10 are arranged so as to face each other. Also at the position of the through hole 4, the harness-side connector 7 and the unit-side connector 10 are electrically connected to each other via a male connection member 11. The male connection member 11 is a freely attachable and detachable member as described later. The use of the male connection member 11 as described below enables separation (electrical disconnection) between circuits at the position of the through hole 4.

The following describes the structures and the like of the harness-side connector 7 of the wire harness 2, the unit case 9 and the unit-side connector 10 of the on-vehicle battery unit 1, and the male connection member 11 in order.

Figure 2:
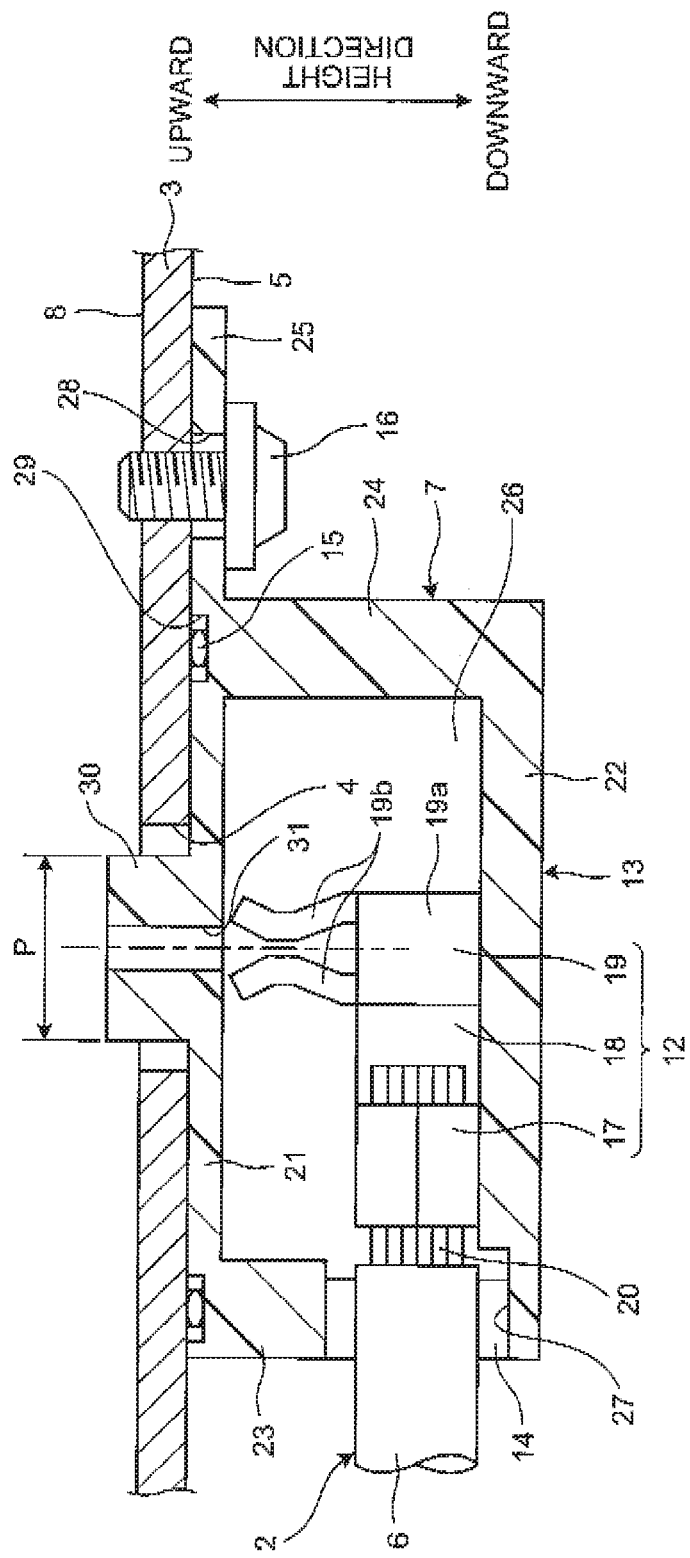
FIG. 2 is a cross-sectional view of a floor panel as a partitioning member and a harness-side connector as a first connector.

The following firstly describes the harness-side connector 7 of the wire harness 2 with reference to FIG. 2. FIG. 2 is a cross-sectional view of the floor panel as the partitioning member and the harness-side connector as the first connector. The following description also refers to FIG. 1 as necessary.

In FIG. 2, the harness-side connector 7 is provided at the rear end of the high-voltage electrically-conducting path 6, as described above. The harness-side connector 7 is a member for electrical connection, and includes a harness-side female terminal 12 (a first female terminal), a harness-side housing 13 (a first housing), and packing 14 and 15. The harness-side connector 7 is fixed to the one surface 5 of the floor panel 3, for example, with a bolt 16.

The harness-side female terminal 12 is obtained by processing an electrically conductive metal plate and forming it into a predetermined female shape. The harness-side female terminal 12 integrally includes an electrical-wire connection part 17, an intermediate part 18, and an electrical contact part 19. The electrical-wire connection part 17 is electrically connected to a conductor 20 that has been exposed by removing a coating of the rear end of the high-voltage electrically-conducting path 6. The electrical-wire connection part 17 may be formed into a welded or pressure-welded type although the present embodiment assumes that it is formed into a crimp type. The intermediate part 18 is formed as a part that links the electrical-wire connection part 17 and the electrical contact part 19 with each other. The intermediate part 18 is provided in a situation where the electrical-wire connection part 17 and the electrical contact part 19 are separated by a small distance from each other.

The electrical contact part 19 is formed in a female shape that enables attachment thereof to the male connection member 11. Specifically, the electrical contact part 19 is formed into the illustrated shape having a base part 19a and a pair of elastic contact pieces 19b, 19b on this base part 19a. The elastic contact pieces 19b, 19b are each "shaped like a Japanese hiragana character "ku" (shaped like an L)" in such a manner that mountain peaks of these pieces face each other. The electrical contact part 19 is formed into a shape that, when a male terminal 44 to be described later is inserted between the pair of elastic contact pieces 19b, 19b, makes contact with the male terminal 44 with appropriate reactive force (the female shape in the drawings is given as one example).

The harness-side housing 13 is obtained by molding an insulating resin material and forming it into a substantially box-like shape. Specifically, the harness-side housing 13 is formed into a substantially box-like shape while including an upper wall 21, a lower wall 22, a front wall 23, a back wall 24, a side wall, a plurality of fixing parts 25, and a terminal accommodating chamber 26.

In the terminal accommodating chamber 26, the harness-side female terminal 12 is accommodated and retained through an aperture 27 formed in the front wall 23. The packing 14 is attached to the aperture 27, so that water-tightness is secured between the aperture 27 and the high-voltage electrically-conducting path 6.

The upper wall 21 is formed as a part that attaches to the one surface 5 of the floor panel 3. The fixing parts each having a bolt insertion hole 28 are formed at a peripheral part of the upper wall 21 continuously therefrom. The harness-side connector 7 is fixed to the one surface 5 of the floor panel 3 by tightening up the bolts 16 that have been inserted into the bolt insertion holes 28. A packing accommodating groove 29 and a harness-side engaging part 30 (a first engaging part) are formed in the upper wall 21. The packing 15 is attached to the packing accommodating groove 29, so that water-tightness is secured between the one surface 5 and the upper wall 21.

The harness-side engaging part 30 is formed as a part that is engaged with (a part that is fitted into) the unit-side connector 10. The harness-side engaging part 30 thus configured is formed into a size that allows it to be inserted into the through hole 4 in the floor panel 3. In the present embodiment, the harness-side engaging part 30 is formed so as to have a height that allows it to slightly project from the opposite surface 8 of the floor panel 3. The harness-side engaging part 30 is formed so that the front end thereof has a fitted dimension P.

A male-terminal insertion hole 31 penetrating to the terminal accommodating chamber 26 is formed in the front end surface of the harness-side engaging part 30. the electrical contact part 19 of the harness-side female terminal 12 is placed at a position inside the harness-side connector 7 that can be viewed through this male-terminal insertion hole 31 (in other words, the electrical contact part 19 is placed in alignment with the through hole 4).

Figure 3:
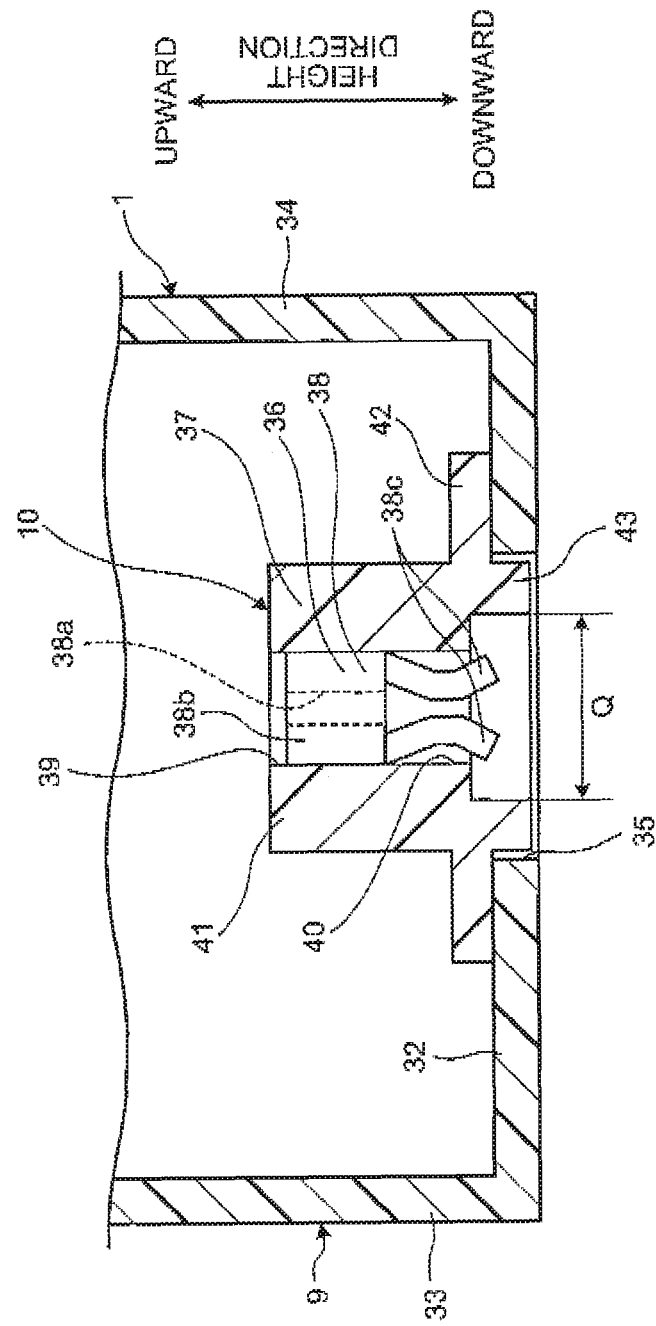
FIG. 3 is a cross-sectional view of a unit case and a unit-side connector as a second connector.

The following describes the unit case 9 and the unit-side connector 10 with reference to FIG. 3. FIG. 3 is a cross-sectional view of the unit case and the unit-side connector as the second connector. The following description also refers to FIG. 1 as necessary.

In FIG. 3, the unit case 9 is formed into a box-like shape while including: a lower wall 32 to be placed on the opposite surface 8 of the floor panel 3; a front wall 33 continued from the periphery of the lower wall 32; a back wall 34; and a side wall. A unit-side through hole 35 is formed in the lower wall 32 in alignment with the through hole 4 in the floor panel 3. This unit-side through hole 35 is formed as a part the aperture of which is larger than the through hole 4 in the floor panel 3. When the unit case 9 is placed on the opposite surface 8 of the floor panel 3, the unit-side through hole 35 and the through hole 4 form a stepped part together.

The unit-side connector 10 is provided as a member for electrical connection in the on-vehicle battery unit 1. The unit-side connector 10 like this includes a unit-side female terminal 36 (a second female terminal) and a unit-side housing 37 (a second housing). The unit-side connector 10 is not only electrically connected to the harness-side connector 7, but also electrically connected to a high-voltage battery (an illustration of which is omitted) and the J/B via a circuit that is not illustrated.

The unit-side female terminal 36 is obtained by processing an electrically conductive metal plate and forming it into a predetermined female shape. The unit-side female terminal 36 integrally includes a circuit connection part that is not illustrated, an electrical contact part 38, and a connection-use penetrating part 38a. The electrical contact part 38 is formed into a female shape that enables attachment thereof to the male connection member 11. Specifically, the electrical contact part 38 is formed into the illustrated shape having a base part 38b and a pair of elastic contact pieces 38c, 38c under this base part 38b. The elastic contact pieces 38c, 38c are each "shaped like a Japanese hiragana character "ku" (shaped like an L)" in such a manner that mountain peaks of these pieces face each other. The electrical contact part 38 is formed into a shape that, when the male terminal 44 to be described later is inserted between the pair of elastic contact pieces 38c, 38c, makes contact with the male terminal 44 with appropriate reactive force (the female shape in the drawings is given as one example).

The connection-use penetrating part 38a is formed, as a part into which the male terminal 44 to be described later is inserted, in the above base part 38b of the electrical contact part 38. The connection-use penetrating part 38a is formed so as to penetrate the base part 38b. The connection-use penetrating part 38a is formed so as also to be able to guide the male terminal 44 into the pair of elastic contact pieces 38c, 38c of the electrical contact part 38. The connection-use penetrating part 38a and the electrical contact part 38 are placed in alignment with the electrical contact part 19 of the harness-side female terminal 12 (the connection-use penetrating part 38a, the electrical contact part 38, and the electrical contact part 19 are placed in alignment with each other in the upward and downward directions).

The unit-side housing 37 is obtained by molding an insulating resin material. The unit-side housing 37 is formed into a substantially box-like or substantially frame-like shape. Specifically, The unit-side housing 37 is formed into a substantially box-like or substantially frame-like shape while including: a housing body 41 including an aperture 39 and a terminal accommodating chamber 40; an on-case placement fixing part 42; and a unit-side engaging part 43 (a second engaging part). The aperture 39 is formed as a part into which the male terminal 44 to be described later is inserted. In the terminal accommodating chamber 40, the unit-side female terminal 36 is accommodated and retained.

The outer side of the housing body 41 is formed as a part with which a connector engaging part 45, to be described later, of the male connection member 11 engages.

The on-case placement fixing part 42 is formed as a part to be placed on the lower wall 32 of the unit case 9. The on-case placement fixing part 42 is formed also as a part to be fixed with an appropriate device. The on-case placement fixing part 42 is formed into a substantially flanged shape.

The upper surface of the on-case placement fixing part 42 is formed as a surface that abuts against the end surface of the connector engaging part 45. The on-case placement fixing part 42 has the function of being a stopper that regulates the insertion length of the male connection member 11.

The unit-side engaging part 43 is formed as a part that is engaged (a part that is fitted) with the harness-side engaging part 30 of the harness-side connector 7 in the wire harness 2. The unit-side engaging part 43 is formed into the illustrated shape that is fitted with the harness-side engaging part 30 from the outside when being inserted into the unit-side through hole 35 of the unit case 9. The unit-side engaging part 43 is formed so that this front end part has a fitted size Q.

Figure 4:
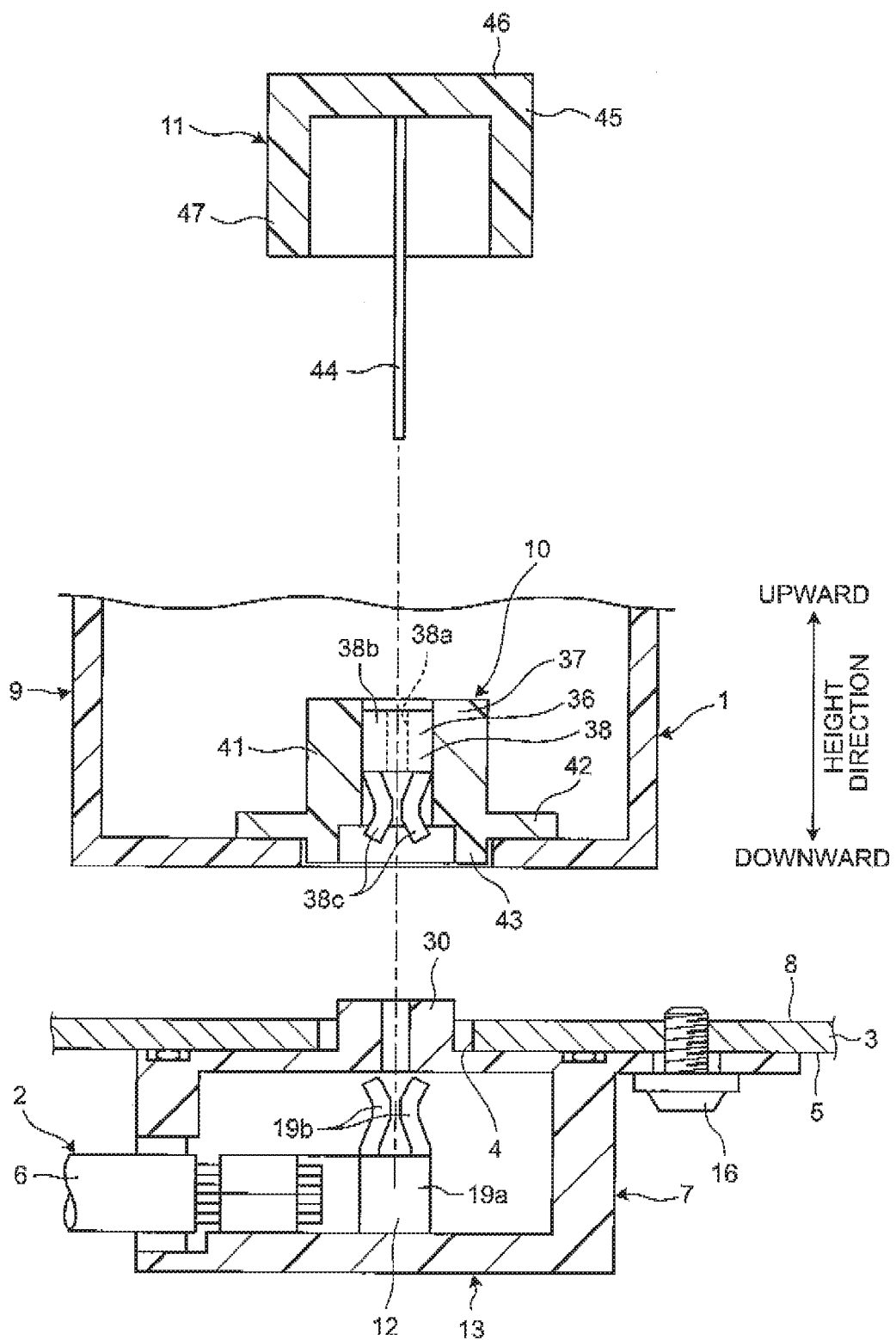
FIG. 4 is a cross-sectional view including a cross-sectional view of a male connection member and illustrating a state immediately before the start of electrical connection using the connector connection structure according to the present invention.

Next, the male connection member 11 is described with reference to FIG. 4. FIG. 4 is a cross-sectional view including the male connection member. The following description also refers to FIG. 1 as necessary.

In FIG. 4, the male connection member 11 is provided as a member for electrically connecting to each other the harness-side connector 7 and the unit-side connector 10 that face each other at a position of the through hole 4 in the floor panel 3. The male connection member 11 includes the electrically-conductive male terminal 44 and the insulating connector engaging part 45.

In the present embodiment, the male connection member 11 is formed so that the male connection member 11 can be freely connected to and disconnected from (freely attached to and detached from) the harness-side connector 7 and the unit-side connector 10. The male connection member 11 is formed so as to have the function of being a service plug because the connection and the disconnection are freely made.

The male terminal 44 is obtained by processing a metal plate to form it into a shape like a straight band plate. The male terminal 44 like this is formed so as to be able to electrically connect the harness-side connector 7 and the unit-side connector 10 to each other. That is, the male terminal 44 is formed so as to be a terminal that is long to some extent. In the male terminal 44, one side used as the base end is fixed to the connector engaging part 45 by being insert-molded.

In the present embodiment, the connector engaging part 45 is formed into a cap-like shape. The connector engaging part 45 is formed into a shape that allows it to engage with the outer side of the housing body 41 in the unit-side connector 10. Specifically, the connector engaging part 45 is formed into the illustrated cap-like shape while including a base wall 46 into which the male terminal 44 is insert-molded, and a frame-like side wall 47 extending downward from the periphery of this base wall 46. The end surface of the side wall 47 is formed as a surface that abuts against the upper surface of the on-case placement fixing part 42 in the unit-side connector 10.

The connector engaging part 45 has a cap-like shape and therefore has the function of being a handle to be used by a worker when the worker works on the electrical connection.

Next, effects of the connector connection structure are described based on the above configurations and structures. Specifically, procedure for electrically connecting the harness-side connector 7 of the wire harness 2 and the unit-side connector 10 of the on-vehicle battery unit 1 with the male connection member 11. The description herein exemplifies a case when maintenance is performed.

Figure 5:
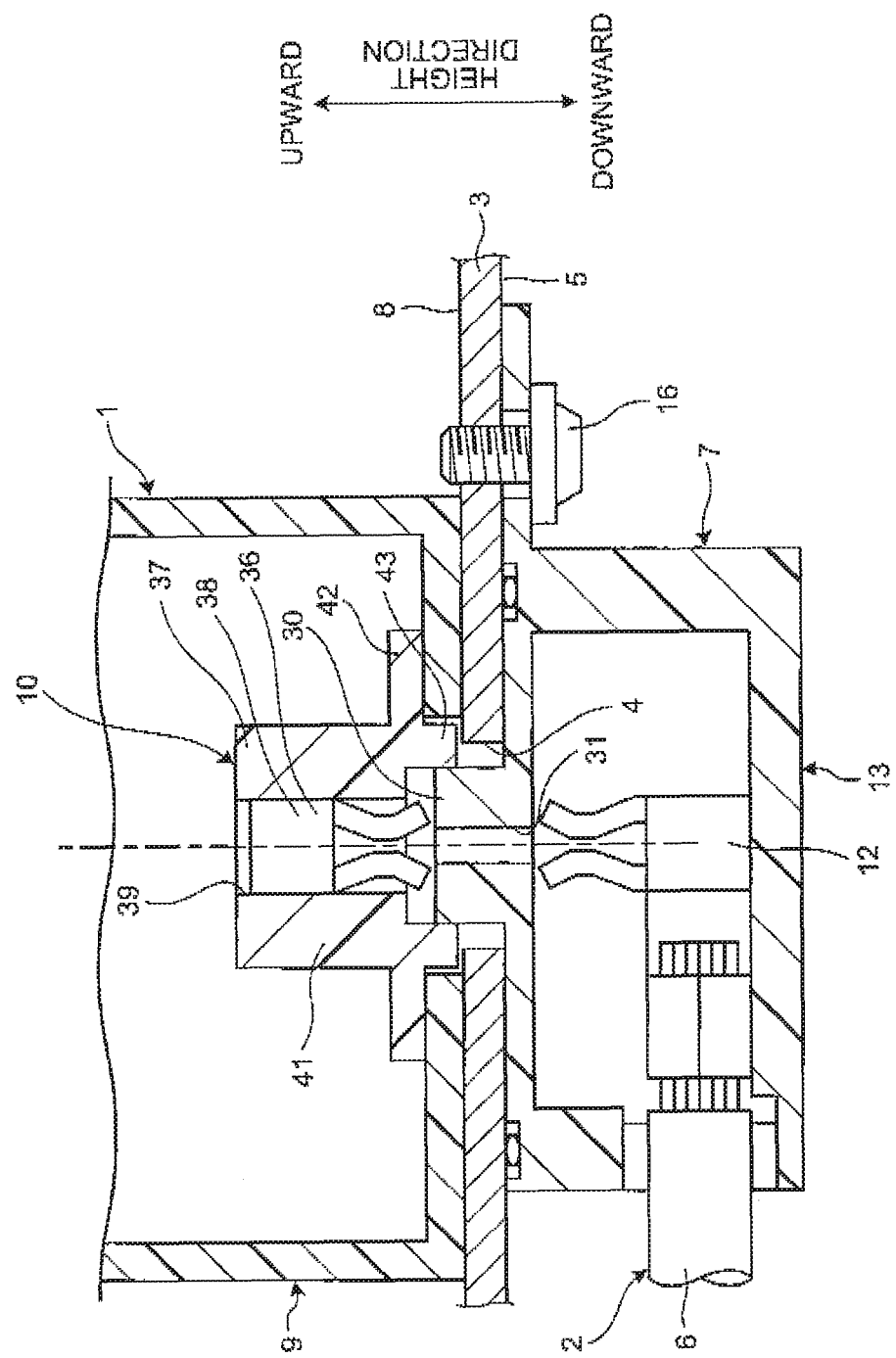
FIG. 5 is a cross-sectional view illustrating a state with the harness-side connector and the unit-side connector facing each other at the position of a through hole.

FIG. 4 that the following description refers to is a cross-sectional view that depicts a state immediately before starting electrical connection using the connector connection structure according to the present invention. FIG. 5 is a cross-sectional view illustrating a state with the harness-side connector and the unit-side connector facing each other at the position of the through hole. FIG. 1 is a cross-sectional view illustrating a state of electrical connection as described above.

In FIG. 4, first of all, the on-vehicle battery unit 1 is caused to face the unit-side connector 10 by being brought down from above the floor panel 3 toward the harness-side connector 7 fixed to the one surface 5 of the floor panel 3. The harness-side engaging part 30 of the harness-side connector 7 and the unit-side engaging part 43 of the unit-side connector 10 then engage each other at the position of the through hole 4 in the floor panel 3 as illustrated in FIG. 5, and the unit-side connector 10 is aligned with the harness-side connector 7. At this time, the harness-side female terminal 12 of the harness-side connector 7 and the unit-side female terminal 36 of the unit-side connector 10 are placed substantially at the same position in the upward and downward directions (at an upper position and a lower position on the same line extending along the height direction). At this time, both of the harness-side female terminal 12 of the harness-side connector 7 and the unit-side female terminal 36 of the unit-side connector 10 are not inserted into the through hole 4 in the floor panel 3, and are maintained at positions where the respective front ends thereof do not project to the corresponding opposite sides of the floor panel 3.

Subsequently, as illustrated in FIG. 4, when electrical connection is started by bringing the male connection member 11 down from above the harness-side connector 7, the male terminal 44 of the male connection member 11 is inserted into the connection-use penetrating part 38a of the unit-side female terminal 36 and then is guided between the pair of the elastic contact pieces 38c, 38c of the unit-side female terminal 36, thereby being brought into electrical connection with the unit-side female terminal 36 (refer to FIG. 4 and FIG. 1).

Thereafter, when electrical connection is continued by further bringing down the male connection member 11 (refer to FIG. 1), the male terminal 44 passes through the through hole 4 in the floor panel 3 to be inserted between the pair of the elastic contact pieces 19b, 19b of the harness-side female terminal 12, thereby being brought into electrical connection with the harness-side female terminal 12 as well. At this time, the connector engaging part 45 of the male connection member. 11 abuts against the on-case placement fixing part 42 of the unit-side connector 10 and prevents the male connection member 11 from further being brought down. Additionally, because the connector engaging part 45 is engaged with the outer side of the housing body 41 in the unit-side connector 10, the male connection member 11 does not come off easily. The engagement of the male connection member 11 completes the sequence of electrical connection.

As described above with reference to FIG. 1 to FIG. 5, the connector connection structure according to the present invention provides a structure in which: after the harness-side connector 7 including the harness-side female terminal 12 and the unit-side connector 10 including the unit-side female terminal 36 are caused to face each other at the position of the through hole 4 in the floor panel 3 while the harness-side female terminal 12 and the unit-side female terminal 36 provided to the respective connectors are kept from being inserted into the through hole 4, the harness-side connector 7 and the unit-side connector 10 are connected by the male terminal 44 of the male connection member 11. Both of the harness-side female terminal 12 and the unit-side female terminal 36 are thus kept from projecting into the respective opposite sides of the floor panel 3 when the harness-side connector 7 and the unit-side connector 10 are assembled with each other via the through hole 4. Thus, the harness-side female terminal 12 and the unit-side female terminal 36 make no contact with each other unless the male terminal 44 is connected thereto and brings about the electrical connection. An effect of enabling a connector connection structure to be provided that does not cause the harness-side female terminal 12 and the unit-side female terminal 36 to collide with each other and deform is brought about even when the harness-side connector 7 or the unit-side connector 10 has received a load while the harness-side connector 7 and the unit-side connector 10 are not facing each other in appropriate directions. An effect of enabling enhancement in ease of assembly and enhancement in ease of maintenance is also brought about as a consequence of adoption of the connector connection structure according to the present invention.

As to the enhancement in ease of assembly and the enhancement in ease of maintenance, an effect described below is further brought about.

More specifically, the connector connection structure according to the present invention is a structure in which the male terminal 44 of the male connection member 11 is inserted through the connection-use penetrating part 38a of the unit-side female terminal 36 to electrically connect two female terminals, that is, the harness-side female terminal 12 and the unit-side female terminal 36, to each other. An effect of enabling easy electrical connection is thus brought about. An effect of enabling easy disconnection is brought about because electrical disconnection therebetween is made simply by pulling the male terminal 44 out of the connection-use penetrating part 38a. Another structure having the connection-use penetrating part 38a in the harness-side female terminal 12 may be adopted.

In the connector connection structure according to the present invention, when the harness-side connector 7 and the unit-side connector 10 are caused to face each other, the harness-side engaging part 30 and the unit-side engaging part 43 engage with each other, and the connectors are consequently aligned with each other. Thus, an effect of enabling smooth and reliable electrical connection using the male connection member 11 is also brought about.

Furthermore, in the connector connection structure according to the present invention, the male connection member 11 that includes the connector engaging part 45 is provided. An effect of enabling continuation and stabilization of the electrical connection is brought about by having the connector engaging part 45 engaged with the housing body 41 of the unit-side connector 10. Utilization of the connector engaging part 45 as a handle for a worker brings about another effect of enabling further enhancement in ease of assembly and further enhancement in ease of maintenance. Another structure may be adopted in which the connector engaging part 45 of the male connection member 11 is engaged with the harness-side connector 7.

Moreover, in the connector connection structure according to the present invention, the male connection member 11 is provided with the function of being a service plug, and an effect of enabling electrical disconnection by detachment of the male connection member 11 is brought about. Obviously, providing the male connection member 11 with the function of being a service plug as with the present invention eliminates the need to additionally provide a service plug, for example, to the J/B or battery side (however, this is not a limiting example, and a service plug may be provided to the J/B or battery side as with a conventional case).

Needless to say, various changes can be made to the present invention without departing from the scope and the spirit of the present invention.

For example, although the above description exemplifies a structure in which the male connection member 11 is manually inserted to electrically connect the harness-side female terminal 12 and the unit-side female terminal 36 to each other via the male terminal 44, reduction in insertion force may be attempted by the application of a publicly known low insertion force (LIF) structure.

Although the above description also exemplifies a structure having the male terminal 44 of the male connection member 11 formed into a shape like a band plate, the shape of the male terminal may be changed to one like a pin with the female terminal sides changed correspondingly.

The present invention can provide a structure in which, after the first connector and the second connector are caused to face each other at the position of the through hole in the partitioning member while the first female terminal and the second female terminal provided to the respective connectors are kept from being inserted into the through hole, the first connector and the second connector are electrically connected by use of the male connection member. Therefore, an effect of making it possible to provide a connector connection structure that prevents deformation of the terminals is brought about. An effect of enabling enhancement in ease of assembly and enhancement in ease of maintenance is also brought about as a consequence.

According to the present invention, an effect of enabling electrical connection and disconnection to be easily made via the connection-use penetrating part is also brought about.

According to the present invention, an effect of enabling alignment of the connectors relative to each other and thus enabling smooth and reliable electrical connection using the male connection member is also brought about.

According to the present invention, an effect of enabling continuation and stabilization of the electrical connection by having the male connection member engaged with the first connector or the second connector, and an effect of enabling utilization of the male connection member as a handle for a worker are also brought about.

According to the present invention, an effect of enabling electrical disconnection by detachment of the male connection member is also brought about.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector connection structure comprising:
   a partitioning member configured to have a through hole;
   a first connector disposed on a side of one surface of the partitioning member, and configured to include a first female terminal having electrical conductivity;
   a second connector disposed on a side of a surface of the partitioning member that is opposite to the one surface, and configured to include a second female terminal having electrical conductivity; and
   a male connection member configured to include a male terminal having electrical conductivity, wherein
   after the first connector and the second connector are caused to face each other at a position of the through hole, the male terminal of the male connection member is caused to pass through the through hole while being connected to any one terminal of the first female terminal and the second female terminal, and then is connected to the other one of the first female terminal and the second female terminal.

2. The connector connection structure according to claim 1, wherein
   the male connection member is a service plug for electrical disconnection.

3. The connector connection structure according to claim 1, wherein
   the male connection member is configured to include a connector engaging part that engages with one of the first connector and the second connector, the one corresponding to the one terminal of the first female terminal and the second female terminal.

4. The connector connection structure according to claim 3, wherein
   the male connection member is a service plug for electrical disconnection.

5. The connector connection structure according to claim 1, wherein
   the one terminal of the first female terminal and the second female terminal is configured to have a connection-use penetrating part therein as a penetrating part for connection, and the male terminal is configured to have a shape that allows free insertion and removal thereof into and from the first female terminal, the second female terminal, and the connection-use penetrating part.

6. The connector connection structure according to claim 5, wherein
   the first connector and the second connector are configured to include a first housing and a second housing that are insulating, and the first housing and the second housing are configured to include a first engaging part and a second engaging part, respectively, that engage with each other at the position of the through hole or at a position near the through hole.

7. The connector connection structure according to claim 6, wherein
   the male connection member is configured to include a connector engaging part that engages with one of the first connector and the second connector, the one corresponding to the one terminal of the first female terminal and the second female terminal.

8. The connector connection structure according to claim 7, wherein
   the male connection member is a service plug for electrical disconnection.

9. The connector connection structure according to claim 6, wherein
the male connection member is a service plug for electrical disconnection.

10. The connector connection structure according to claim 5, wherein
the male connection member is configured to include a connector engaging part that engages with one of the first connector and the second connector, the one corresponding to the one terminal of the first female terminal and the second female terminal.

11. The connector connection structure according to claim 10, wherein
the male connection member is a service plug for electrical disconnection.

12. The connector connection structure according to claim 5, wherein
the male connection member is a service plug for electrical disconnection.

13. The connector connection structure according to claim 1, wherein
the first connector and the second connector are configured to include a first housing and a second housing that are insulating, and the first housing and the second housing are configured to include a first engaging part and a second engaging part, respectively, that engage with each other at the position of the through hole or at a position near the through hole.

14. The connector connection structure according to claim 13, wherein
the male connection member is configured to include a connector engaging part that engages with one of the first connector and the second connector, the one corresponding to the one terminal of the first female terminal and the second female terminal.

15. The connector connection structure according to claim 14, wherein
the male connection member is a service plug for electrical disconnection.

16. The connector connection structure according to claim 13, wherein
the male connection member is a service plug for electrical disconnection.

* * * * *